US008856265B2

(12) United States Patent
Boone

(10) Patent No.: US 8,856,265 B2
(45) Date of Patent: Oct. 7, 2014

(54) EVENT NOTIFICATION BASED ON SUBSCRIBER PROFILES

(75) Inventor: Joan Phillips Boone, Efland, NC (US)

(73) Assignee: International Business Machines Corporation, Armonk, NY (US)

(*) Notice: Subject to any disclaimer, the term of this patent is extended or adjusted under 35 U.S.C. 154(b) by 1864 days.

(21) Appl. No.: 10/737,081

(22) Filed: Dec. 16, 2003

(65) Prior Publication Data

US 2005/0132016 A1 Jun. 16, 2005

(51) Int. Cl.
*G06F 15/16* (2006.01)

(52) U.S. Cl.
USPC .......................................... 709/217

(58) Field of Classification Search
USPC ..................... 707/1; 709/201–203
See application file for complete search history.

(56) References Cited

U.S. PATENT DOCUMENTS

| | | | |
|---|---|---|---|
| 5,995,943 A | 11/1999 | Bull et al. | 705/14 |
| 6,279,112 B1 | 8/2001 | O'Toole, Jr. et al. | 713/201 |
| 6,311,210 B1 | 10/2001 | Foladare et al. | 709/206 |
| 6,327,574 B1 | 12/2001 | Kramer et al. | 705/14 |
| 6,546,374 B1 | 4/2003 | Esposito et al. | 705/27 |
| 6,549,939 B1 | 4/2003 | Ford et al. | 709/217 |
| 6,578,025 B1 | 6/2003 | Pollack et al. | 707/2 |
| 6,721,780 B1* | 4/2004 | Kasriel et al. | 709/203 |
| 2001/0044743 A1 | 11/2001 | McKinley et al. | 705/14 |
| 2002/0103778 A1* | 8/2002 | Saxena | 707/1 |
| 2002/0123928 A1* | 9/2002 | Eldering et al. | 705/14 |
| 2002/0199194 A1* | 12/2002 | Ali | 725/46 |
| 2003/0023690 A1 | 1/2003 | Lohtia | 709/206 |
| 2003/0087652 A1* | 5/2003 | Simon et al. | 455/466 |
| 2006/0026642 A1* | 2/2006 | Schaffer et al. | 725/46 |

OTHER PUBLICATIONS

Berg, J., "Advanced metering and monitoring, an invaluable tool to becoming successful in a competitive environment," *Official Proceedings of the Tenth Intl. Power Quality '97 Power Value '97*, Sep. 9-12, 1997, USA.
Hu et al., "A method and system to help customer keep track of e-business process and be notified of key information in time," *Research Disclosure*, Abstract No. 436157 (Aug. 2000).

* cited by examiner

*Primary Examiner* — Sulaiman Nooristany
(74) *Attorney, Agent, or Firm* — Cuenot, Forsythe & Kim, LLC

(57) ABSTRACT

A method, system, and computer program product is disclosed that evaluates the characteristics of a new content source with respect to subscriber profiles. The subscriber profile attributes are evaluated and weighted algorithmically to produce an "inference score" that is a measure used to predict the interest that subscribers may have with respect to the new content. If the inference score is significant enough (e.g., above a certain threshold value), then the service provider can take measures to inform those subscribers deemed to have a high level of interest in the new content of its existence, e.g., by sending a simple notification to the subscriber with a response link for setting up a subscription.

9 Claims, 4 Drawing Sheets

EVENT NOTIFICATION BASED ON SUBSCRIBER PROFILES

BACKGROUND OF THE INVENTION

1. Field of the Invention

This invention relates, in general, to event computing systems and, in particular, to correlating new events being offered by an event computing system with current consumers of the event computing system.

2. Description of the Related Art

The concept of "events" in the computing realm is a well-known concept whereby an action, or event, triggers another action helpful to a system user. Events are, for example, data generated by a provider and delivered through communication medium, such as a computer network, hard disk, or random access memory, to a set of interested consumers. The providers and consumers need not know one another's identity, since delivery is provided through intermediary software. This independence between provider and consumer is known as decoupling.

One example of an event computing system is a database event system. Modern database systems include support for event triggers. Event triggers associate a filter, which is a predicate that selects a subset of events and excludes the rest, with an action to take in response to events on the database. An event on a database is any change to the state of the database; a filter might be the reaching of certain threshold value for a particular database item.

Another example of an event computing system is a distributed event system, also known as a publish/subscribe (or pub/sub) system or a notification service. A pub/sub system is a mechanism whereby subscribers express interest in future information by some selection criterion (subscribing), publishers provide information (publishing), and a mechanism delivers the information to all interested subscribers. A notification service sends notifications, or alerts, about events of interest to users based on their subscriptions.

Notification services organize information around groups (also called channels, subjects, or streams). Providers or publishers publish events to groups and consumers or subscribers subscribe to all data from a particular group. Typically, the subscribers are presented with a selection of available content sources for the groups, and the ability to specify filters for each. The specification of filters represents the subscription that is compared to content published to the service. When a "match" occurs, a notification message containing the published content is sent to the subscriber.

Prior art systems utilize the concept of a subscriber profile to obtain and store basic information about the subscriber (name, age, email address, etc), and a notification service may attempt to also obtain more detailed information by requesting, but not requiring, the subscriber to give demographic information (age, sex, marital status, etc), address information, occupation, and information regarding interests (e.g., occupation, hobbies, etc). Not surprisingly, many subscribers give the bare minimum of information, fearing that any information beyond what they perceive as "necessary" might be used for marketing purposes or might be obtained by hackers and used for ill purpose.

The subscriber is then presented with a list of content sources to which they may subscribe and receive content on an ongoing basis. For example, a subscriber might subscribe to a Major League Baseball source to receive content related to all major league baseball teams, to a Wall Street Journal investment source for general financial information, and to a National Weather Service source to receive worldwide weather information; for broad-based information such as this, they might request (e.g., by checking a box or making a menu selection) to have the information sent to an email address for reading at their leisure. Further, the subscriber may be particularly interested certain elements from these broad categories, e.g., Philadelphia Phillies baseball scores and severe weather alerts for the Philadelphia region, and the price of IBM stock; for these areas of particular interest, the user might designate that the Phillies scores be sent to a handheld device that the subscriber carries with them and checks periodically, and have Philadelphia region severe weather alerts and IBM stock price changes sent immediately to an "always on" device such as a cell phone or pager so that the subscriber receives the content essentially instantaneously.

Once the subscriber has registered and made subscription selections, the notification service directs content and/or notifications regarding available content to the subscriber based upon the selections that they have made. All of the information above (general subscriber information as well as specific subscription selections and directives regarding delivery of content and/or content notifications/alerts) make up the subscriber profile of a subscriber.

A problem arises, however, when new subscription sources become available, sources to which the subscriber is not currently subscribed. In a service provider environment, e.g., AllTel's Axcess Services or Info Alerts by Cingular Wireless, there may be hundreds of thousands of customers using a notification service. When new content sources become available, it can be problematic for the provider to inform customers of the new content.

The notification service has an interest in increasing the number of subscriptions that subscriber subscribes to; for a telephone-related company such as the previously-mentioned AllTel or Cingular, increased data traffic increases revenues, since the subscriber uses the telephone services to access the subscriptions. For all types of service providers, advertising revenues can be increased with increased subscriptions, and higher quality services (e.g., reduced "spam") can increase subscribers.

To advise subscribers of new content, the notification service has essentially two choices. First, they can decline to send information regarding the new subscription to that subscriber, since that subscriber has not selected the subscription. This assures the notification service that it is not sending unwanted and potentially annoying information (i.e. "spam") to the subscriber. Alternatively, the notification service can send notification to the subscriber (and all subscribers) about the new content, even though the subscriber has not expressed interest in the content. While this may result in the subscriber deciding to subscribe to the new content events, it may also annoy the subscriber if the subscriber has no interest in the new content.

Accordingly, it would be desirable to have a method for evaluating the characteristics of new content with respect to subscriber profiles, and then accurately project, based on inferences from existing subscriber information, which subscribers are likely to be interested in the new content.

SUMMARY OF THE INVENTION

The present invention provides a method, system, and computer program product that evaluates the characteristics of a new content source with respect to subscriber profiles. The subscriber profile attributes are evaluated and weighted algorithmically to produce an "inference score" that is a measure used to predict the interest that subscribers may have with respect to the new content. If the inference score is significant enough (e.g., above a certain threshold value), then the service provider can take measures to inform those subscribers deemed to have a high level of interest in the new content of its existence, e.g., by sending a simple notification to the subscriber with a response link for setting up a subscription.

In a representative embodiment of the present invention, the invention comprises a method of identifying new content sources of potential interest to a subscriber, comprising the steps of: analyzing existing subscriber information for the subscriber; inferring additional subscriber information for the subscriber based on the existing subscriber information; analyzing characteristics of new content sources; and identifying new content sources of potential interest to the subscriber based on the inferring step and the analyzing steps.

DETAILED DESCRIPTION OF THE PREFERRED EMBODIMENTS

The present invention takes advantage of existing information already known about subscribers. Specifically, in accordance with the present invention, existing information about the subscriber and/or directives given to the notification service regarding particular aspects of their subscriptions and how they are to be delivered is used to infer whether or not the subscriber has a high or low likelihood of desiring the new content. This allows the notification service to streamline the amount of unrequested solicitations it makes to its subscribers and increases the likelihood that those subscribers who are solicited will subscribe to the new content.

In accordance with the present invention, a subscriber profile is evaluated and information contained therein is weighted algorithmically to produce a measure of affinity between the subscriber associated with the subscriber profile and new content. The subscriber profile includes certain information which lends itself to this inference. Specifically, the subscriber profile includes current subscription topics and filters; devices (telephonic device, PDA, laptop computer, desktop computer) utilized by the subscriber; a correlation between the subscribed-to content and the delivery method being used (voice message, text message, email) and/or location of the delivery (e.g., office, home) and/or the device (s) to which it is delivered; and context information (e.g., a location where they live or a location of interest) which, on its face, does not necessarily indicate interests of the subscriber but can be used to infer interest in connection with a particular aspect of a subscription. Further, to increase the accuracy of the inference score, the subscriber profile is "time bounded", meaning that only relatively "fresh" information from the subscriber file is used to generate the inference score, so that the subscriber profile information used is a snapshot of the recent past, such as the past month, the past two weeks, the past two days, the past 24 hours, etc., i.e., the information used is indicative of current interests of the subscriber.

The present invention is discussed below in relation to a notification service that allows users to subscribe to various content sources and receive feeds and alerts respecting their subscription selections; it is understood, however, that the present invention is not limited to such an example and will function in any event system.

Figure 1:
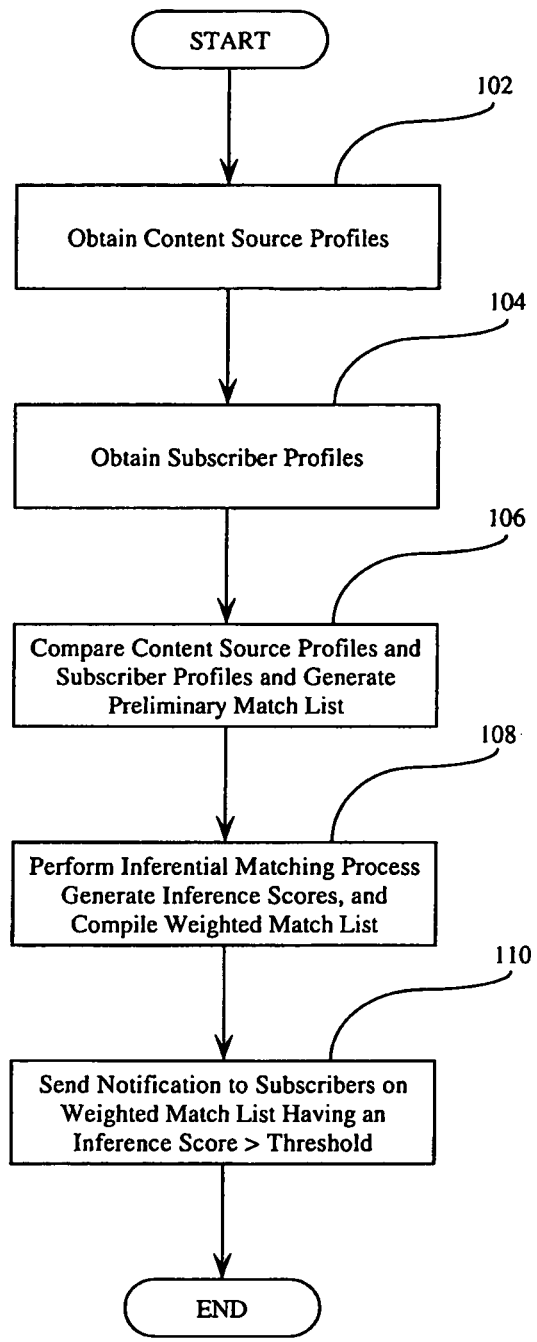
FIG. 1 is a flowchart illustrating an example of a method for determining which subscribers to a notification service are likely to be interested in subscribing to a new subscription source.

FIG. 1 is a flowchart illustrating an example of a method for determining which subscribers to a notification service are likely to be interested in subscribing to a new subscription source. Referring to FIG. 1, at step 102, a content source profile is obtained. The content source profile is obtained by analysis of a particular content source, e.g., the new subscription source available for the first time to subscribers. In connection with the present invention, the content source profile includes the name of the content provider, a list of any topics and categories (e.g., topic: sports; category: major league baseball; subcategory: Boston Red Sox) associated with the new content; the publication frequency of the content (e.g., daily; hourly; realtime); and any geographic code indicators.

At step 104, a subscriber profile is obtained, and at step 106, the information in the subscriber profile is compared with the information in the content source profile, and a preliminary match list is generated. The generation of the preliminary match list "weeds out" subscribers who clearly have no interest in the subject matter of the content to which the content source profile pertains. For example, a user may have a profile suggesting a strong interest in Major League Baseball and the Philadelphia Phillies, and also a strong interest in NFL Football and the Tampa Bay Buccaneers, but have no suggestion of any interest in gardening or NCAA Women's Soccer; further, another user may have checked a box in their profile indicating that they do not wish to receive information regarding any new subscriptions. Step 106 is optional; if desired, the inferential matching process of the present invention can be performed directly on each subscriber. However, by weeding out subscribers who clearly have no interest in the subject matter of the new content, the inferential matching process is performed more quickly and efficiently.

At step 108, the inferential matching process of the present invention is performed on the subscribers in the preliminary match list. As described in more detail below with respect to FIG. 2, performance of the inferential matching process involves the evaluation of each subscriber in the preliminary match list (if step 106 is performed) and the generation of an inference score for each subscriber. The inference score is indicative of the likelihood that a particular subscriber will or will not wish to be informed of the new subscription content. Then, a weighted match list is generated by ranking the subscribers sequentially by their inference score, so that, for example, the subscriber with the highest inference score is at the top of the list and the subscriber with the lowest inference score is at the bottom, with the others listed in descending order by their inference score.

At step 110, notification of the new subscription content is sent to all subscribers having an inference score at or above a predetermined threshold value, and then the process ends.

Figure 2:
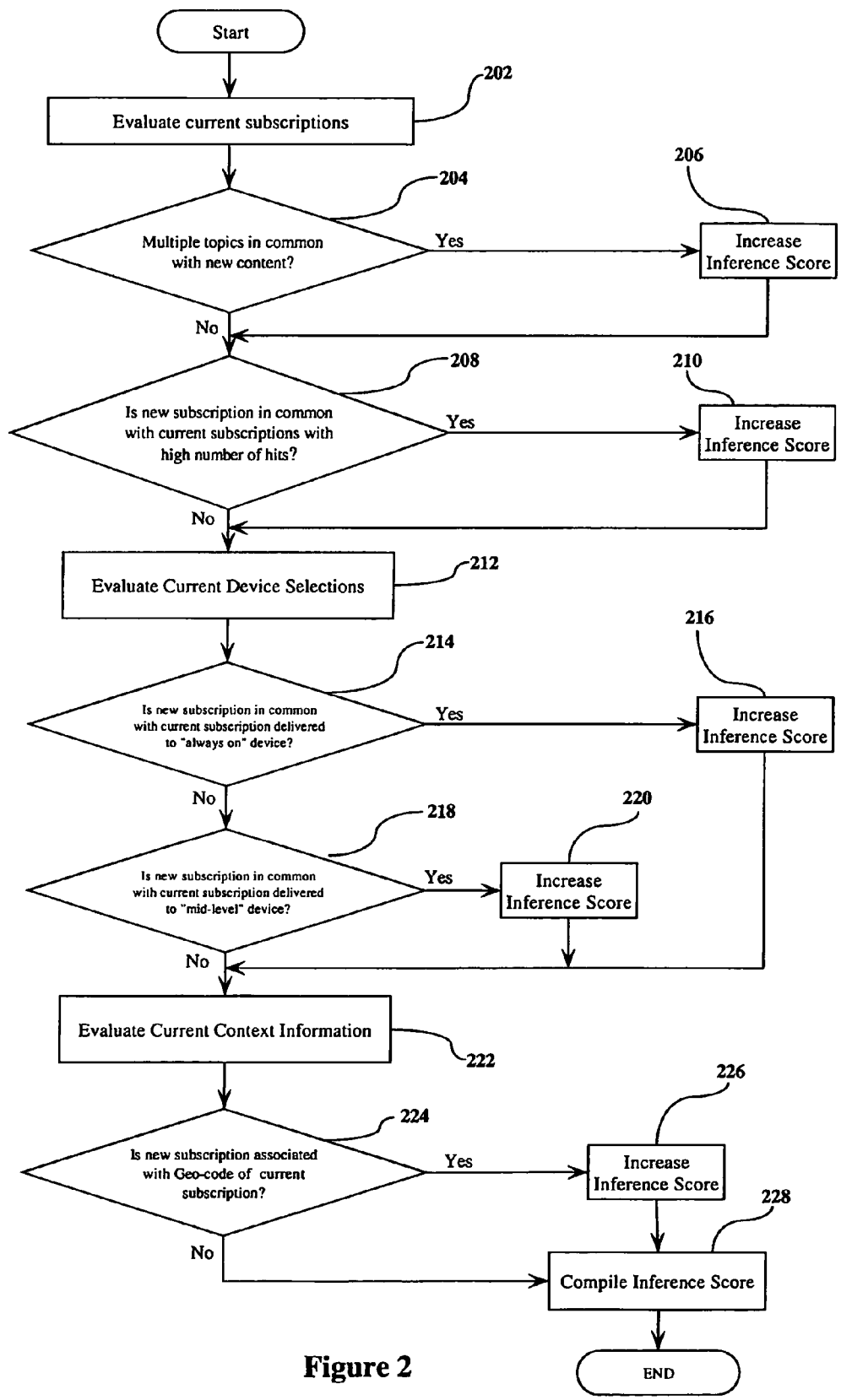
FIG. 2 is a flowchart illustrating steps performed in accordance with the present invention to generate the inference score described above for a single subscriber.

FIG. 2 is a flowchart illustrating steps performed in accordance with the present invention to generate the inference score described above for a single subscriber. The process is repeated for each subscriber (or those that are on the preliminary match list, if generated). It is understood that numerous parameters can be factored into generation of the inference score and still fall within the scope of the present invention; the parameters used herein are for the purpose of example only, and any parameter(s) that enable the inferring of potential interest in a particular event will function in accordance with the present invention. It is assumed for the purpose of this example that each new content element has an initial inference score of zero.

At step 202, current subscriptions of the first subscriber are evaluated. At step 204, it is determined if the subscriber has multiple subscription topics in common with the content of the new subscription. If desired, a threshold number of subscription topics in common with the new topic can be required to generate a "yes" to this inquiry (e.g., if the new subscription pertains to gardening, the subscriber under scrutiny could be required to have at least three subscriptions under the topic of gardening to generate a "yes" response). If yes, the process proceeds to step 206, where the inference score is increased by a predetermined amount, and then the process proceeds to step 208. If desired, a threshold can also be set so that more "multiple topics" will increase the inference score by a larger amount than if there are less "multiple topics").

If the inquiry of step 204 generates a "no" response, then the process proceeds directly to step 208, where it is determined if the new subscription content is in common with current subscriptions that receive a high number of "hits" for the subscriber. A high number of hits would allow an inference that the subscriber is interested in the content; thus, if the inquiry results in a "yes" response, the process proceeds to step 210, where the inference score is increased and the process then goes to step 212. If the inquiry at step 208 generates a "no" response, the process proceeds directly to step 212.

At step 212, the current device selections of the subscriber are evaluated. The purpose of conducting this evaluation is to determine which subscriptions are of a high level of interest to the subscriber (indicated, for example, by a direction to send the content/alerts to an "always on" device like a cell phone or pager); which are of a mid-level of importance (indicated, for example, by a direction to send the content/alerts to a portable, but not always on, device such as a wireless PDA); and which are of a low level of importance (indicated, for example, by a direction to send them to a an email address on a desktop PC).

It is understood that it may be difficult or impossible to be able to distinguish between email sent to a desktop from email sent to a PDA or other device; typically email is simply directed to an email address, and the user retrieves the email using various methods and devices, depending upon the circumstances. However, text/instant messaging is another method of providing alerts, and it can be presumed that an alert sent via test/instant messaging has a higher level of importance than an alert sent via email, if text messaging or voice alerts to a cell phone are available and an option for the user. The important aspect for purposes of the present invention is that a determination be made, from among the various methods available to the subscriber, as to which methods of receiving alerts are available for the user and from those, that a hierarchy from most important to least important be established.

Thus, if desired, at step 212, the system can be configured to treat alerts delivered to "channels" via telephone numbers as having a greater importance than alerts delivered to an email address. Phone numbers imply a greater level of "connectedness" than an email address, and thus imply faster receipt. If desired, the process can be augmented by having subscribers specify delivery prioritization, e.g., from highest to lowest. For example, a subscriber might indicate the following delivery directions, form highest to lowest priority:

voice message to work phone
voice message to personal phone
text message to work address (phone/pda/laptop)
text message to personal address (phone/pda/laptop)
email message to work email address (phone/pda/laptop)
email message to personal email address (phone/pda/laptop)

As long as a priority is established, it can be used to then determine the importance of particular information types to that user, and thus be used in accordance with the present invention to infer importance of new subscription information to that same user.

At step 214, it is determined if the new subscription is in common with current subscriptions delivered to an "always on" device (or other "highest level" device). If yes, the process proceeds to step 216, where the inference score is increased, and the process proceeds to step 222. If no, the process proceeds to step 218, where it is determined if the new subscription is in common with current subscriptions to a "mid-level" device. If the response at step 218 is yes, the process proceeds to step 220, where the inference score is increased, by an amount less than the increase at step 216 (since the weight given to subscription content delivered to an always-on device should be greater than the weight given to subscription content delivered to a mid-level device). If the response at step 218 is no, it is assumed that the subscription content is in common only with content that the subscriber has delivered to a low-level device (or in a low-level manner) and the process proceeds directly to step 222.

At step 222, current context information is evaluated. For example, at step 224, it is determined if the new subscription content is associated with a Geo-code in common with a Geo-code of any current subscriptions. If yes, the process proceeds to step 226, where the inference score is increased, and then the process goes on to step 228. If no, the process proceeds to step 228 directly. Step 228 is where the inference score is compiled, based on the processes described above. Thus, if new subscription content is of a topic in common with the topics of multiple subscriptions of a user, and of a subscription of the user that has numerous hits, and is in common with subject matter for which the subscriber has content/alerts sent to an always-on device, and had a Geo code in common with a Geo code of subscriptions of the user, the new content will receive a high inference score and be towards the top of the list compiled in step 108 of FIG. 1.

Having identified a set of targeted subscribers, notifications are sent to the notification services that include an example of the new content source, with the option to create a new subscription.

The following is an example scenario illustrating the use of the present invention. In this example, a user has a subscription to daily weather forecasts for the city where he lives, Philadelphia, that are delivered to his e-mail address. He also has a subscription for severe weather alerts in Philadelphia that are delivered to his cell phone whenever they occur. A new National Weather Service service becomes available that provides geographic-coded weather information (forecasts, alerts, etc.) for the entire nation. A new content source profile is created for the National Weather Service service, identifying that it includes weather information and provides an alert service and includes geo-codes to identify local weather information. This new content profile is published for comparison to existing subscriber profiles. The user in this example is selected to receive the notification which advertises the new service to him because his profile indicates that he has an interest in weather information (two subscription, daily hits); severe weather alerts are high priority because they are sent to his cell phone, an always on device; and he already has provided information limiting some of his subscriptions to city of Philadelphia, indicating that he might be interested in receiving location-specific weather alerts.

Using the present invention, subscribers are not required to update or constantly monitor their profile information, or be apprised of or review new subscriptions being added on a daily basis. Rather, using the present invention, subscribers who, while not specifically indicating a desire to receive new event information, have profile information which allows an inference that they will be interested in the new information, will be notified of the new information and given an opportunity to subscribe. This minimizes the amount of "spam" that must be delivered to the subscribers and allows the notification services selectively "push" new subscriptions to existing subscribers with a high likelihood that they will be interested in them.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage maintained by a notification service. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

Figure 3:
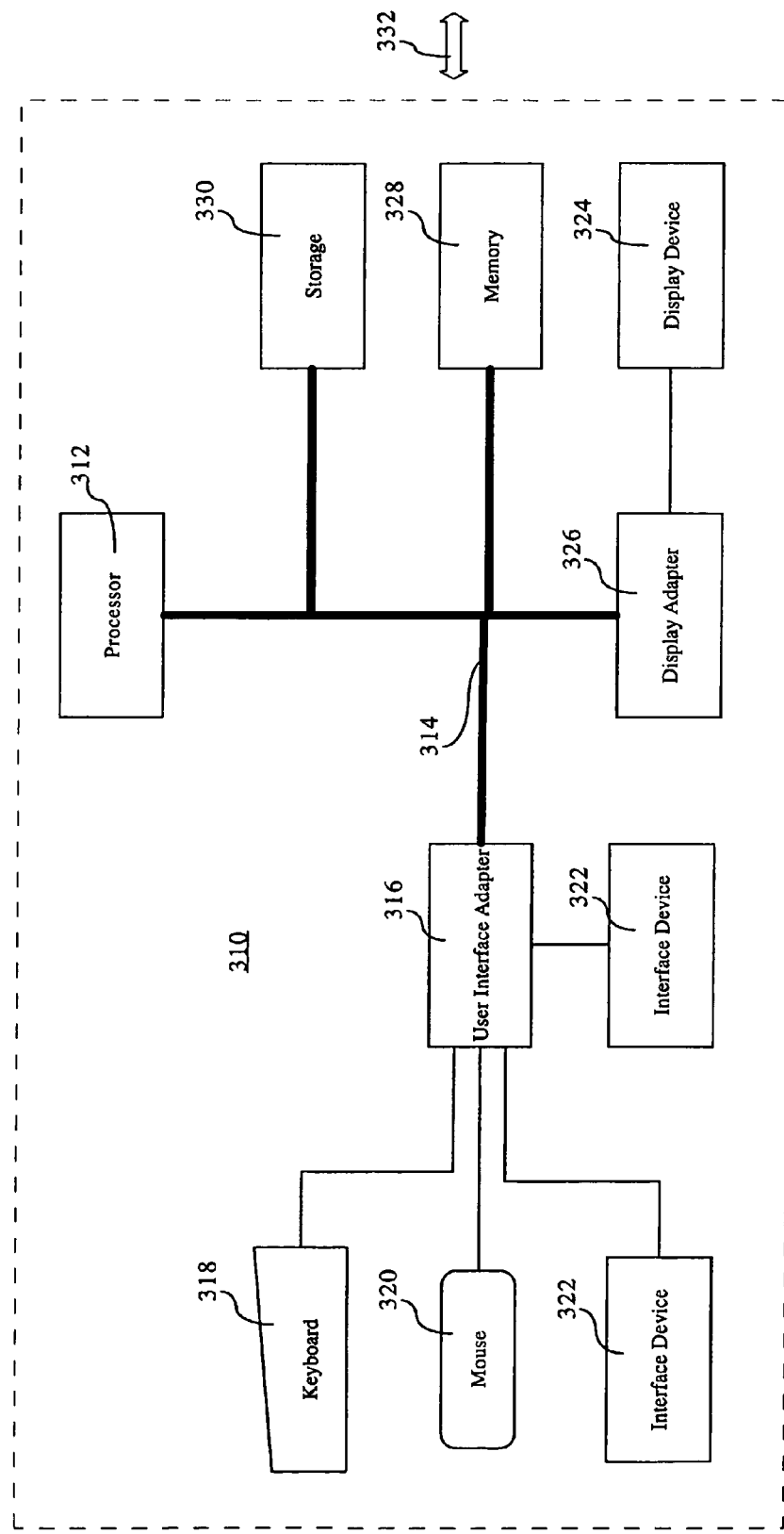
FIG. 3 illustrates a representative workstation hardware environment in which the present invention may be practiced.

FIG. 3 illustrates a representative workstation hardware environment in which the present invention may be practiced. The environment of FIG. 3 comprises a representative single user computer workstation 310, such as a personal computer, including related peripheral devices. The workstation 310 includes a microprocessor 312 and a bus 314 employed to connect and enable communication between the microprocessor 312 and the components of the workstation 310 in accordance with known techniques. The workstation 310 typically includes a user interface adapter 316, which connects the microprocessor 312 via the bus 314 to one or more interface devices, such as keyboard 318, mouse 320, and/or other interface devices 322, which can be any user interface device, such as a touch sensitive screen, digitized entry pad, etc. The bus 314 also connects a display device 324, such as an LCD screen or monitor, to the microprocessor 312 via a display adapter 326. The bus 314 also connects the microprocessor 312 to memory 328 and long term storage 330 which can include a hard drive, tape drive, etc.

The workstation 310 communicates via a communications channel 332 with other computers or networks of computers. The workstation 310 may be associated with such other computers in a local area network (LAN) or a wide area network, or the workstation 310 can be client in a client/server arrangement with another computer, etc. All of these configurations, as well as the appropriate communications hardware and software, are known in the art.

Figure 4:
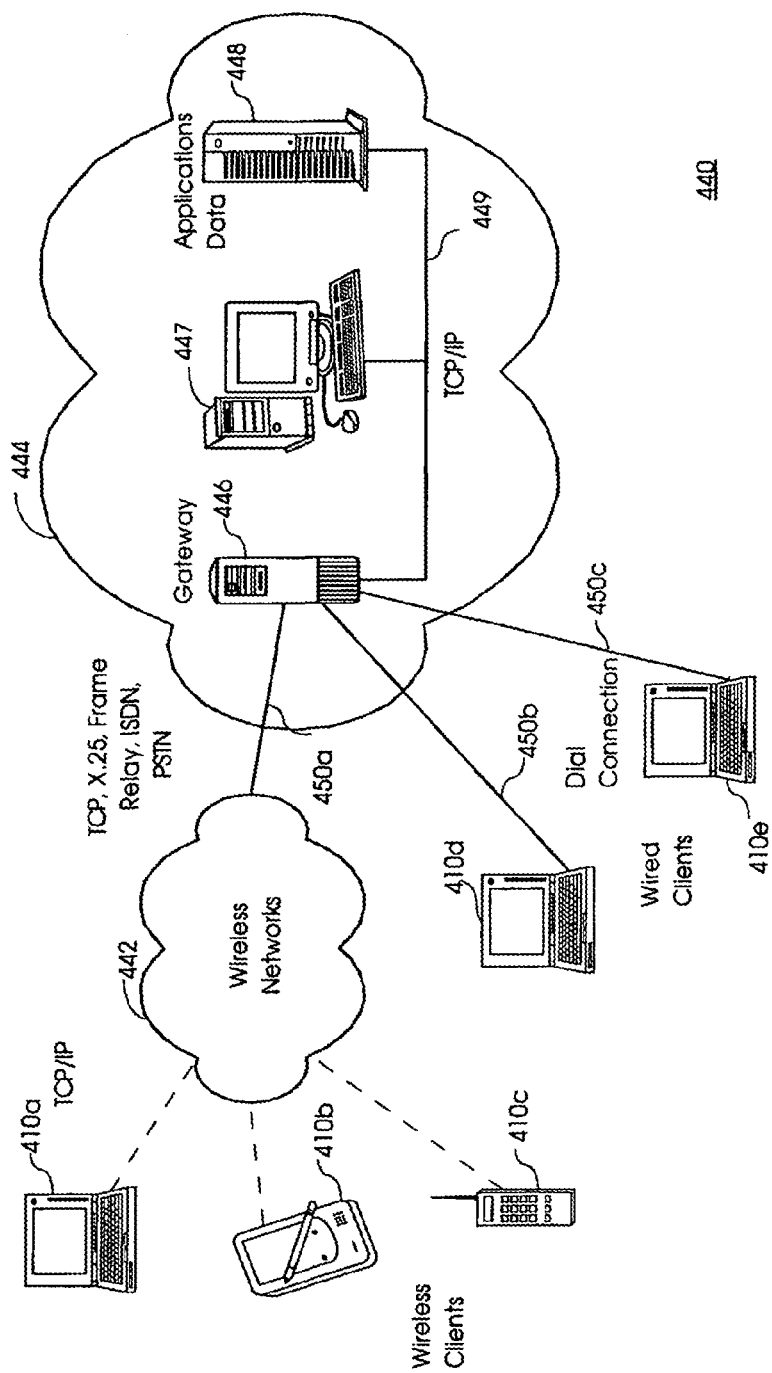
FIG. 4 illustrates an exemplary data processing network in which the present invention may be practiced

FIG. 4 illustrates an exemplary data processing network 440 in which the present invention may be practiced. The data processing network 440 may include a plurality of individual networks, such as wireless network 442 and network 444, each of which may include a plurality of individual workstations/devices, e.g. 410a, 410b, 410c. Additionally, as those skilled in the art will appreciate, one or more LANs may be included (not shown), where a LAN may comprise a plurality of intelligent workstations coupled to a host processor.

The networks 442 and 444 may also include mainframe computers or servers, such as a gateway computer 446 or application server 447 (which may access a data repository 448). A gateway computer 446 serves as a point of entry into each network 444. The gateway computer 446 may be preferably coupled to another network 442 by means of a communications link 450a. The gateway computer 446 may also be directly coupled to one or more workstations, e.g 410d, 410e using a communications link 450b, 450c. The gateway computer 446 may be implemented using any appropriate processor, such as IBM's Network Processor. For example, the gateway computer 446 may be implemented using an IBM pSeries (RS/6000) or xSeries (Netfinity) computer system, an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.) These are merely representative types of computers with which the present invention may be used.

The gateway computer 446 may also be coupled 449 to a storage device (such as data repository 448). Further, the gateway 446 may be directly or indirectly coupled to one or more workstations/devices 410d, 410e, and servers such as application server 447.

Those skilled in the art will appreciate that the gateway computer 446 may be located a great geographic distance from the network 442, and similarly, the workstations/devices may be located a substantial distance from the networks 442 and 444. For example, the network 442 may be located in California, while the gateway 446 may be located in Texas, and one or more of the workstations/devices 410 may be located in New York. The workstations/devices 410 may connect to the wireless network 442 using a networking protocol such as the Transmission Control Protocol/Internet Protocol ("TCP/IP") over a number of alternative connection media, such as cellular phone, radio frequency networks, satellite networks, etc. The wireless network 442 preferably connects to the gateway 446 using a network connection 450a such as TCP or UDP (User Datagram Protocol) over IP, X.25, Frame Relay, ISDN (Integrated Services Digital Network), PSTN (Public Switched Telephone Network), etc. The workstations/devices 410 may alternatively connect directly to the gateway 446 using dial connections 450b or 450c. Further, the wireless network 442 and network 444 may connect to one or more other networks (not shown), in an analogous manner to that depicted in FIG. 4.

The present invention may be used on a client computer or server in a networking environment, or on a standalone workstation (for example, to prepare a file or to process a file which has been received over a network connection, via a removable storage medium, etc.). (Note that references herein to client and server devices are for purposes of illustration and not of limitation: the present invention may also be used advantageously with other networking models.) When used in a networking environment, the client and server devices may be connected using a "wireline" connection or a "wireless" connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The workstation or client computer may be any type of computer processor, including laptop, handheld or mobile computers; vehicle-mounted devices; desktop computers; mainframe computers; etc., having processing (and, optionally, communication) capabilities. The server, similarly, can be one of any number of different types of computer which have processing and communication capabilities. These techniques are well known in the art, and the hardware devices and software which enable their use are readily available.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

I claim:

1. A method of identifying new content sources for a subscriber, comprising:
    analyzing existing subscriber information associated only with the subscriber;
    generating, based solely upon the existing subscriber information, additional subscriber information for the subscriber;
    analyzing characteristics of a new content source; and
    identifying the new content source to the subscriber based upon the additional subscriber information, wherein the generating includes calculating an inference score, with respect to the subscriber, for the content based upon the additional subscriber information, and the identifying is based upon the inference score exceeding a predetermined threshold level;
    wherein the existing subscriber information includes
    current subscription information,
    location information, and
    device delivery information.

2. The method of claim 1, wherein the additional subscriber information includes priority information based upon the existing current subscription information and device delivery information associated with the subscriber.

3. The method of claim 1, wherein
    the existing subscriber information is time bounded.

4. A computer hardware system configured to identify new content sources for a subscriber, comprising:
    at least one processor, wherein the at least one processor is configured to initiate and/or perform:
    analyzing existing subscriber information associated only with the subscriber;
    generating, based solely upon the existing subscriber information, additional subscriber information for the subscriber;
    analyzing characteristics of a new content source; and
    identifying the new content source to the subscriber based upon the additional subscriber information, wherein the generating includes calculating an inference score, with respect to the subscriber, for the content based upon the additional subscriber information, and the identifying is based upon the inference score exceeding a predetermined threshold level;
    wherein the existing subscriber information includes
    current subscription information,
    location information, and
    device delivery information.

5. The system of claim 4, wherein the additional subscriber information includes priority information based upon the existing current subscription information and device delivery information associated with the subscriber.

6. The system of claim 4, wherein
    the existing subscriber information is time bounded.

7. A non-transitory computer-readable storage medium comprising:
    a computer program product having stored therein computer usable program code for identifying new content sources for a subscriber, the computer usable program code, which when executed by a computer hardware system, causes the computer hardware system to perform:
    analyzing existing subscriber information associated only with the subscriber;
    generating, based solely upon the existing subscriber information, additional subscriber information for the subscriber; analyzing characteristics of a new content source; and
    identifying the new content source to the subscriber based upon the additional subscriber information, wherein the generating includes calculating an inference score, with respect to the subscriber, for the content based upon the additional subscriber information, and the identifying is based upon the inference score exceeding a predetermined threshold level;
    wherein the existing subscriber information includes
    current subscription information,
    location information, and
    device delivery information.

8. The non-transitory computer-readable storage medium of claim 7, wherein the additional subscriber information includes priority information based upon the existing current subscription information and device delivery information associated with the subscriber.

9. The non-transitory computer-readable storage medium of claim 7, wherein the existing subscriber information is time bounded.

* * * * *